United States Patent
Takase et al.

(10) Patent No.: US 9,501,215 B2
(45) Date of Patent: Nov. 22, 2016

(54) IMAGE DISPLAY DEVICE, IMAGE DISPLAY CONTROL METHOD, PROGRAM AND INFORMATION STORAGE MEDIUM

(71) Applicant: Sony Computer Entertainment Inc., Tokyo (JP)

(72) Inventors: Masaki Takase, Tokyo (JP); Munetaka Tsuda, Kyoto (JP);
(Continued)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/857,917

(22) Filed: Sep. 18, 2015

(65) Prior Publication Data
US 2016/0004404 A1 Jan. 7, 2016

Related U.S. Application Data

(63) Continuation of application No. 13/880,152, filed as application No. PCT/JP2011/073865 on Oct. 17, 2011, now Pat. No. 9,177,532.

(30) Foreign Application Priority Data

Oct. 20, 2010 (JP) .................................. 2010-235965

(51) Int. Cl.
*G06F 3/0485* (2013.01)
*G06F 3/0488* (2013.01)
(Continued)

(52) U.S. Cl.
CPC ............. *G06F 3/0485* (2013.01); *G06F 3/041* (2013.01); *G06F 3/0488* (2013.01);
(Continued)

(58) Field of Classification Search
None
See application file for complete search history.

(56) References Cited

U.S. PATENT DOCUMENTS

| 7,469,381 | B2 | 12/2008 | Ording |
| 8,375,334 | B2 | 2/2013 | Nakano |
| 2004/0100479 | A1 | 5/2004 | Nakano |

(Continued)

FOREIGN PATENT DOCUMENTS

| CN | 1458565 A | 11/2003 |
| CN | 101627351 A | 1/2010 |

(Continued)

OTHER PUBLICATIONS

International Search Report for corresponding PCT Application PCT/JP2011/073865, dated Dec. 20, 2011.
(Continued)

*Primary Examiner* — Edward Martello
(74) *Attorney, Agent, or Firm* — Matthew B. Dernier, Esq.

(57) ABSTRACT

Methods and apparatus provide for: displaying on a screen a partial area image indicating a given area within an image to be displayed; moving the given area in response to a predetermined operation performed by a user; and determining whether or not the given area is located at an end portion of the image to be displayed, where, when the given area is located at the end portion of the image to be displayed, in response to the predetermined operation performed by the user, instead of moving the given area, changing an appearance of the partial area image displayed on the screen and displaying the partial area image on the screen.

18 Claims, 7 Drawing Sheets

(72) Inventors: You Asakura, Tokyo (JP); Takashi Hatakeda, Tokyo (JP)

(51) Int. Cl.
*G09G 5/34* (2006.01)
*G06F 3/041* (2006.01)
*G06F 3/0484* (2013.01)

(52) U.S. Cl.
CPC .............. *G06F 3/04845* (2013.01); *G09G 5/34* (2013.01); *G06F 2203/04806* (2013.01)

(56) References Cited

U.S. PATENT DOCUMENTS

| | | |
|---|---|---|
| 2008/0168404 A1 | 7/2008 | Ording |
| 2010/0199214 A1 | 8/2010 | Mikawa |
| 2011/0199312 A1 | 8/2011 | Okuta |

FOREIGN PATENT DOCUMENTS

| | | |
|---|---|---|
| JP | 2004062648 A | 2/2004 |
| JP | 2010515978 A | 5/2010 |
| JP | 2010140329 A | 6/2010 |

OTHER PUBLICATIONS

International Preliminary Report on Patentability and Written Opinion for corresponding PCT Application PCT/JP2011/073865, dated May 16, 2013.

Office Action for corresponding Japanese Patent Application 2010-235965, dated Jun. 24, 2014.

Office Action for corresponding Chinese Patent Application No. 201180050858.3, dated Apr. 28, 2015.

Office Action for related U.S. Appl. No. 13/880,152, dated Jan. 15, 2015.

IMAGE DISPLAY DEVICE, IMAGE DISPLAY CONTROL METHOD, PROGRAM AND INFORMATION STORAGE MEDIUM

CROSS REFERENCE TO RELATED APPLICATIONS

This application claims the benefit of U.S. patent application Ser. No. 13/880,152, filed Apr. 18, 2013, which is a national stage application claiming priority to PCT/JP2011/073865, filed Oct. 17, 2011, which claims priority to Japanese Patent Application No. JP 2010-235965, filed Oct. 20, 2010, the entire disclosures of which, if filed in English, are hereby incorporated by reference.

TECHNICAL FIELD

The present invention relates to an image display device, an image display control method, a program, and an information storage medium, and more particularly, to an improvement of a user interface for image display.

BACKGROUND ART

In a case where an image to be displayed (such as a photographic image or a web page) larger than a screen size is displayed on a screen, there is known a user interface for displaying a partial area corresponding to the screen size on the screen and moving the partial area in the image to be displayed in response to a scrolling operation performed by a user. In a case where a touch screen is used as the screen, examples of the scrolling operation include dragging or a flick. According to this user interface, a user can cause an arbitrary area within the image to be displayed on the screen with the scrolling operation.

SUMMARY OF INVENTION

Technical Problem

However, according to the above-mentioned user interface technology, when an area at an end portion of the image to be displayed is displayed on a screen, a user cannot immediately grasp whether or not the currently displayed area is an end area. For example, in a case where the scrolling operation is performed downward to display a lower end area of the image to be displayed on the screen, the user has no other way to determine that the lower end area is being currently displayed on the screen on the grounds that contents of the screen do not change even when the scrolling operation is performed further downward.

The present invention has been made in view of the above-mentioned problem, and an object thereof is to provide an image display device, an image display control method, a program, and an information storage medium which allow a user to immediately understand that an end area of an image to be displayed has been displayed on a screen.

Solution to Problem

In order to solve the above-mentioned problem, according to the present invention, there is provided an image display device, including: display means for displaying on a screen a partial area image indicating a given area within an image to be displayed; display area moving means for moving the given area in response to a predetermined operation performed by a user; and determination means for determining whether or not the given area is located at an end portion of the image to be displayed, in which, when the given area is located at the end portion of the image to be displayed, the display means changes a display magnification of the partial area image displayed on the screen and display the partial area image on the screen in response to the predetermined operation performed by the user.

Here, when the given area is located at the end portion of the image to be displayed, the display means may reduce the partial area image displayed on the screen and display the partial area image on the screen in response to the predetermined operation performed by the user.

Further, when the given area is located at the end portion of the image to be displayed, the display means may enlarge the partial area image displayed on the screen and display the partial area image on the screen in response to the predetermined operation performed by the user.

Further, after displaying the partial area image on the screen with the display magnification changed, the display means may return the display magnification to an original value and display the partial area image on the screen.

According to the present invention, there is also provided an image display control method, including the steps of: displaying on a screen a partial area image indicating a given area within an image to be displayed; moving the given area in response to a predetermined operation performed by a user; and determining whether or not the given area is located at an end portion of the image to be displayed, in which the step of displaying a partial area image includes changing, when the given area is located at the end portion of the image to be displayed, a display magnification of the partial area image displayed on the screen and displaying the partial area image on the screen in response to the predetermined operation performed by the user.

According to the present invention, there is further provided a program for causing a computer to function as: display means for displaying on a screen a partial area image indicating a given area within an image to be displayed; display area moving means for moving the given area in response to a predetermined operation performed by a user; determination means for determining whether or not the given area is located at an end portion of the image to be displayed; and means for changing, when the given area is located at the end portion of the image to be displayed, a display magnification of the partial area image displayed on the screen and displaying the partial area image on the screen in response to the predetermined operation performed by the user. This program may be stored in a computer-readable information storage medium such as a CD-ROM, a DVD-ROM, or a memory card.

DESCRIPTION OF EMBODIMENTS

Now, an embodiment of the present invention is described in detail with reference to the accompanying drawings.

Figure 1:
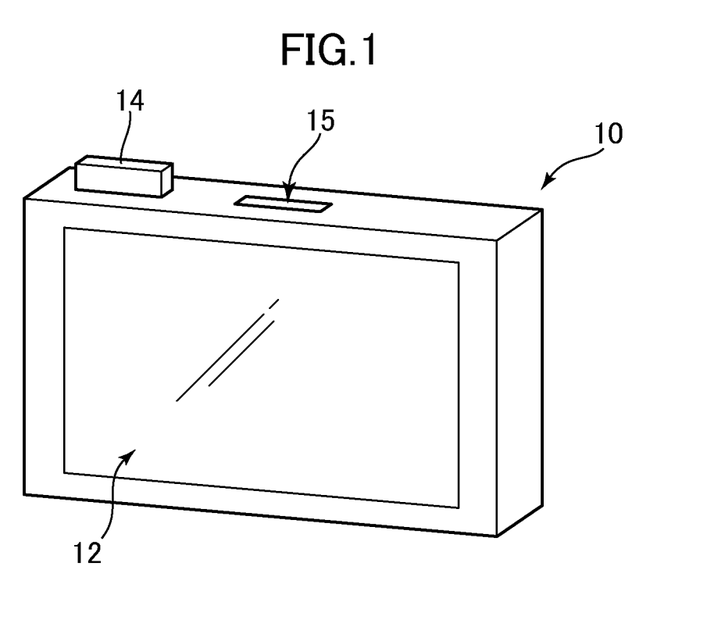
FIG. 1 An external perspective view of a portable information processing device according to an embodiment of the present invention.
Figure 2:
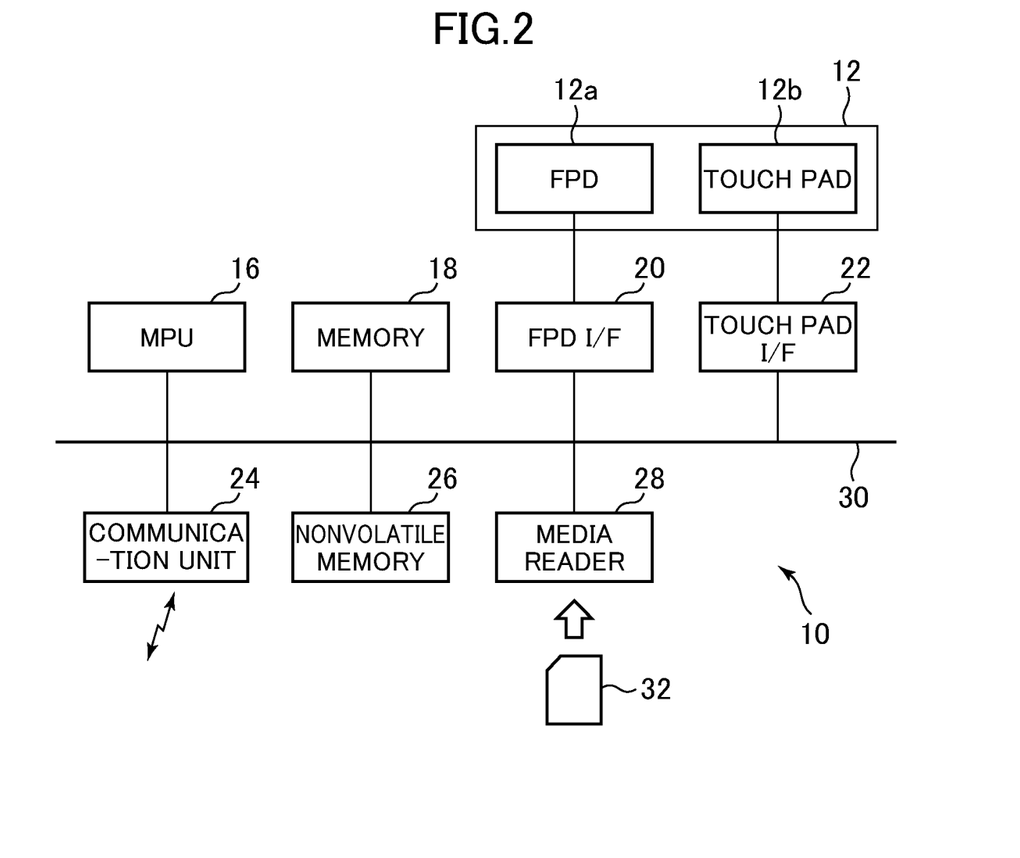
FIG. 2 A hardware configuration diagram of the portable information processing device according to the embodiment of the present invention.

FIG. 1 is an external perspective view of a portable information processing device according to the embodiment of the present invention, and FIG. 2 is a hardware configuration diagram of the portable information processing device. A portable information processing device 10 illustrated in those figures represents an embodiment of a image display device according to the present invention, and a control method therefor represents an embodiment of a image display control method according to the present invention. Further, a program executed on the portable information processing device 10 represents an embodiment of a program according to the present invention. The portable information processing device 10 is a computer system including a casing having a thin box shape as illustrated in FIG. 1, and has a front surface, a large part of which is occupied by a touch surface of a touch panel 12, and a side surface provided with a power button 14 and a memory card slot 15. This portable information processing device 10 is driven by a chargeable internal battery (not shown).

As illustrated in FIG. 2, the portable information processing device 10 includes an MPU 16, a memory 18, an FPD interface 20, a touch pad interface 22, a communication unit 24, a nonvolatile memory 26, and a media reader 28, which are connected to a bus 30 and enabled to transmit/receive data to one another. As described above, the portable information processing device 10 includes the touch panel 12. This touch panel 12 includes a flat panel display (FPD) 12*a* using liquid crystal or organic electro-luminescence (EL) and a touch pad 12*b* of a capacitive type or other such type. The FPD interface 20 is connected to the FPD 12*a*, and the touch pad interface 22 is connected to the touch pad 12*b*. The memory 18 is used as a work space for the MPU 16. The FPD interface 20 includes a memory for saving an image to be displayed on the FPD 12*a*, periodically outputs the image stored in the memory to the FPD 12*a*, and updates the image to be displayed by the FPD 12*a*. The touch pad interface 22 periodically performs an arithmetic operation for a touched position based on a signal output from the touch pad 12*b*, and provides the touched position to the MPU 16. The communication unit 24 is connected to a data communication network such as the Internet, and has a function of transmitting and receiving data. The nonvolatile memory 26 is storage means having a larger capacity than the memory 18, and stores an operating system and various application programs. The media reader 28 reads data from a computer-readable information storage medium such as a memory card 32, and writes data into such a computer-readable information storage medium.

On this portable information processing device 10, a web browser program for displaying a web page image on the touch panel 12 which allows a web page to be scrolled in response to a user operation performed with respect to the touch surface is executed. This program may be a part of the operating system, or may be an application program which runs on the operating system. Further, this program may be stored in the nonvolatile memory 26 in advance, or may be downloaded through the communication unit 24 before being stored in the nonvolatile memory 26. Further, the program may be copied from the memory card 32 to the nonvolatile memory 26, or a program stored in the memory card 32 may be executed directly by the MPU 16.

FIGS. 3 to 7 illustrate web page images displayed on the touch panel 12. By controlling the communication unit 24, data on the web page is downloaded by the web browser program from another information processing device via a data communication network. A display range of the touch panel 12 corresponds to a part of the web page image, and when the user performs a dragging operation or a flick operation on the touch surface of the touch panel 12, the web page image can be moved relatively to the display range, which allows an arbitrary part of the web page image to be displayed on the touch panel 12.

Figure 3:
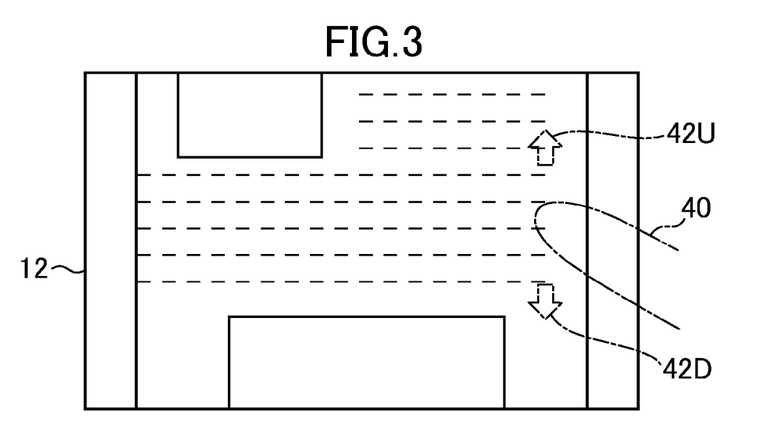
FIG. 3 A diagram illustrating a screen during page scrolling.
Figure 4:
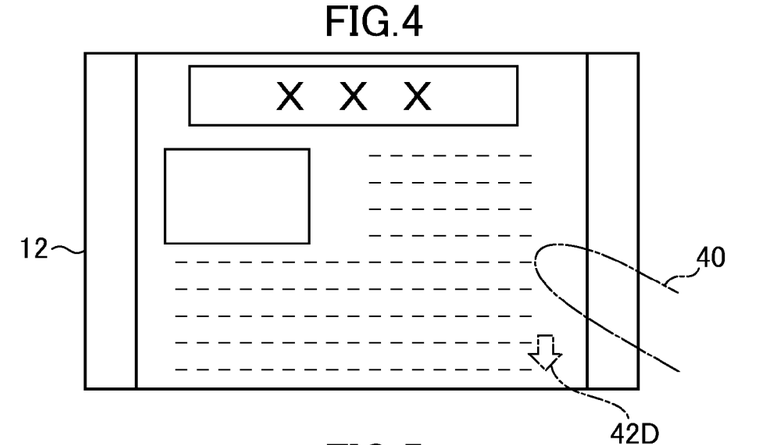
FIG. 4 A diagram illustrating the screen during the page scrolling.
Figure 5:
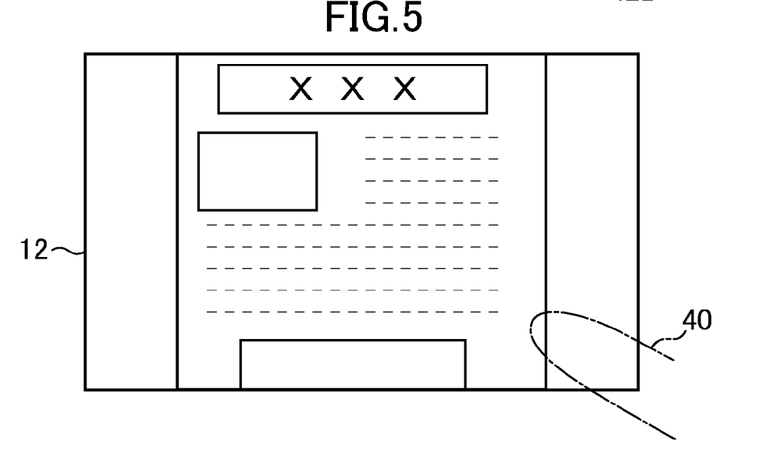
FIG. 5 A diagram illustrating the screen during end processing.

Specifically, as illustrated in FIG. 3, in a state in which a middle part of the web page image in a vertical direction is displayed, when the user slides (drags) his/her fingertip 40 in a downward direction indicated by an arrow 42D with the fingertip 40 kept touching the touch surface, the web page image is moved downward relatively to the display range in accordance with a sliding amount, which displays an upper end portion of the web page image on the touch panel 12 as illustrated in FIG. 4. In this state, the web page image has moved to a lower limit in the downward direction. In this state, when the user further slides the fingertip 40 in the downward direction indicated by the arrow 42D with the fingertip 40 kept touching the touch surface, as illustrated in FIG. 5, the web page image is reduced and displayed on the touch panel 12. At this time, a display magnification corresponds to the sliding amount. Note that, in FIGS. 4 and 5, a display position of the upper edge of the web page image is unchanged. In other words, in both the figures, the upper edge of the web page image is displayed at the upper edge of the touch panel 12. In the state of FIG. 5, when the touched position is slid upward, the display magnification becomes larger in accordance with the sliding amount (the web page image is displayed to be larger), and when the touched position is slid downward, the display magnification becomes smaller in accordance with the sliding amount (the web page image is displayed to be smaller). Further, when the fingertip 40 is released from the touch surface, the display magnification gradually becomes closer to 1, and the image finally returns to an original size.

Figure 6:
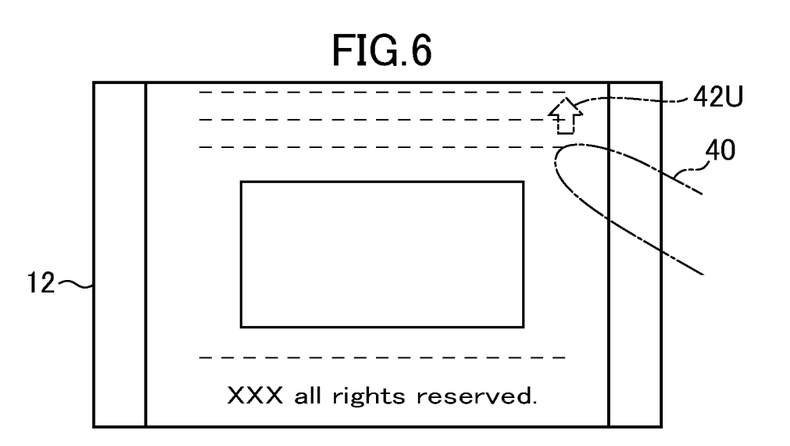
FIG. 6 A diagram illustrating the screen during the page scrolling.
Figure 7:
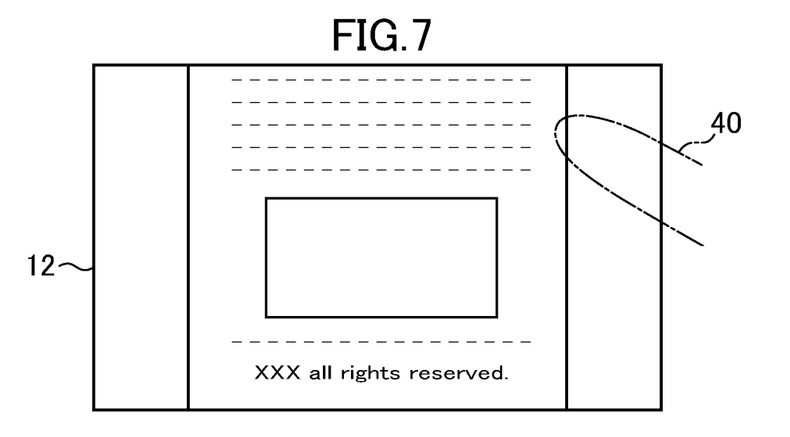
FIG. 7 A diagram illustrating the screen during end processing.

In the same manner, as illustrated in FIG. 3, in a state in which the middle part of the web page image in the vertical direction is displayed, when the user slides (drags) his/her fingertip 40 in an upward direction indicated by an arrow 42U with the fingertip 40 kept touching the touch surface, the web page image is moved upward relatively to the display range in accordance with a sliding amount, which displays a lower end portion of the web page image on the touch panel 12 as illustrated in FIG. 6. In this state, the web page image has moved to an upper limit in the upward direction. In this state, when the user further slides the fingertip 40 in the upward direction indicated by the arrow 42U with the fingertip 40 kept touching the touch surface, as illustrated in FIG. 7, the web page image is reduced and displayed on the touch panel 12. Also at this time, a display magnification corresponds to the sliding amount. Note that, in FIGS. 6 and 7, a display position of the lower edge of the web page image is unchanged. In other words, in both the figures, the lower edge of the web page image is displayed at the lower edge of the touch panel 12. In the state of FIG. 7, when the touched position is slid downward, the display magnification becomes larger in accordance with the sliding amount (the web page image is displayed to be larger), and when the touched position is slid upward, the display magnification becomes smaller in accordance with the sliding amount (the web page image is displayed to be smaller). Further, when the fingertip 40 is released from the touch surface, the display magnification gradually becomes closer to 1, and the image finally returns to an original size.

Further, in this embodiment, it is detected that the user has flicked the touch panel 12 with the fingertip 40, and when it is detected that a downward flick has been performed, the web page image is moved downward through the display range (automatic scrolling). The flick is an operation for sliding the fingertip 40 on the touch surface at a speed equal to or higher than a predetermined reference speed with the fingertip 40 kept touching the touch surface and going on to release the fingertip 40 from the touch surface. After the flick, the fingertip 40 of the user is released from the touch surface of the touch panel 12, while the web page image keeps moving downward. In this case, as a sliding speed at a time of the flick becomes faster, an initial speed of movement becomes faster. Further, as time elapses, the moving speed of the web page image becomes slower, and the movement is finally stopped. Further, when the upper edge of the web page image reaches the upper edge of the display range during the automatic scrolling, the web page image is gradually reduced, and after that, the web page image returns to the original size. Then, when the web page image completely returns to the original size, the screen stops changing.

In the same manner, when it is detected that an upward flick has been performed, the web page image is moved upward through the display range. After the flick, the fingertip 40 of the user is released from the touch surface of the touch panel 12, while the web page image keeps moving upward. Also in this case, as a sliding speed at a time of the flick becomes faster, an initial speed of movement becomes faster. Further, as time elapses, the moving speed of the web page image becomes slower, and the movement is finally stopped. Further, when the lower edge of the web page image reaches the lower edge of the display range during the automatic scrolling, the web page image is gradually reduced, and after that, the web page image returns to the original size. Then, when the web page image completely returns to the original size, the screen stops changing.

As described above, when the upper edge of the web page image reaches the upper edge of the display range of the touch panel 12 in the operation (flick or dragging) for moving the web page image downward, the web page image does not move further downward, and instead, the web page image is reduced and displayed. In the same manner, when the lower edge of web page image reaches the lower edge of the display range of the touch panel 12 in the operation (flick or dragging) for moving the web page image upward, the web page image does not move further upward, and instead, the web page image is reduced and displayed. In this manner, it is possible to make it easier for the user to understand that the web page image has reached the lower limit or the upper limit, that is, whether or not the upper limit of the web page image is displayed at the upper limit of the display range or whether or not the lower limit of the web page image is displayed at the lower limit of the display range.

Figure 8:
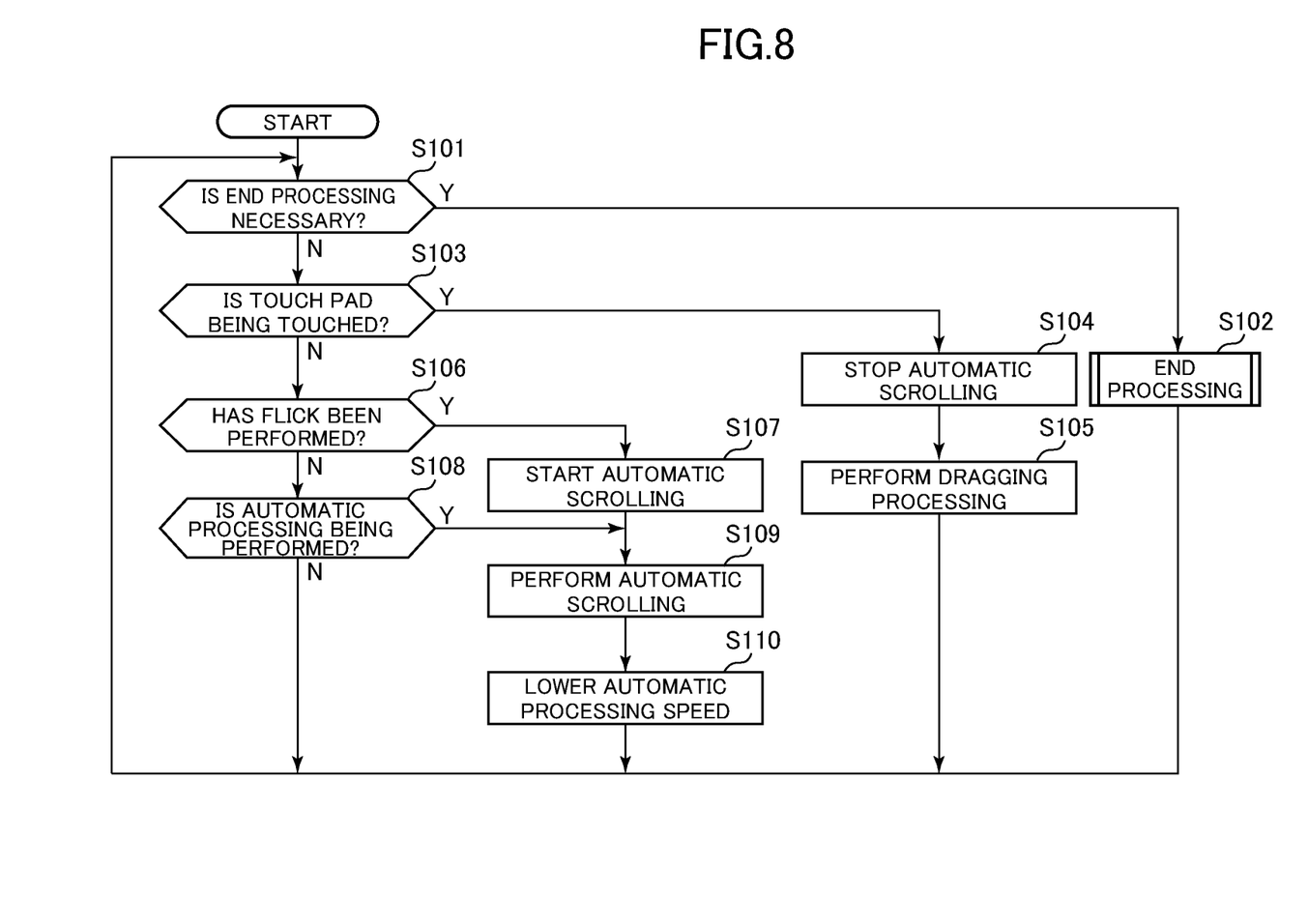
FIG. 8 A flowchart illustrating information processing for page display.
Figure 9:
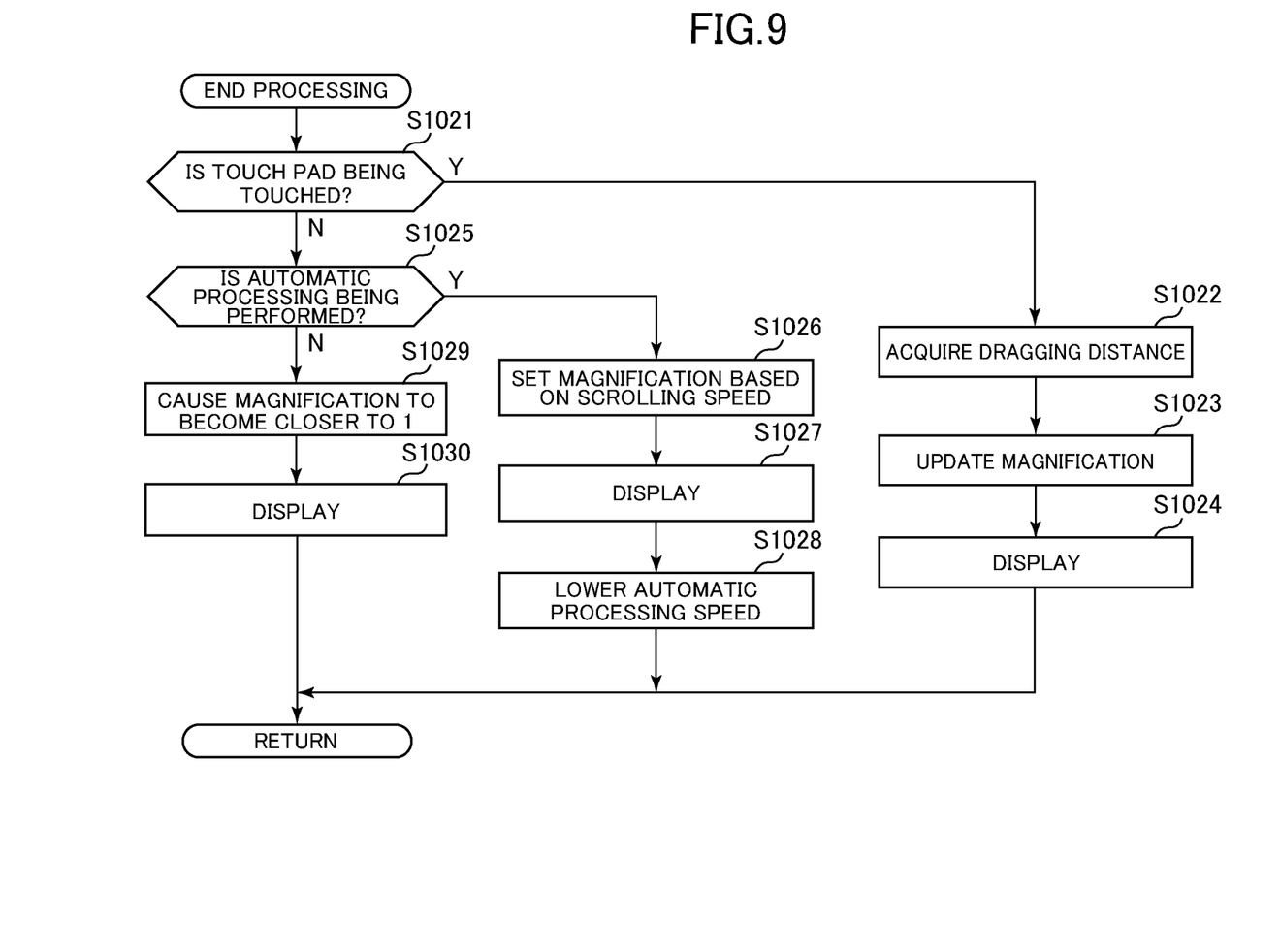
FIG. 9 A flowchart illustrating the information processing for the page display.

Next, processing for displaying the web page image is described in more detail. FIGS. 8 and 9 illustrate the processing for displaying the web page image performed by the web browser program. As illustrated in FIG. 8, in this program, it is first determined whether or not end processing is necessary (S101). The end processing is processing illustrated by a flowchart of FIG. 9 and executed after the upper edge of the web page image reaches the upper edge of the display range in the operation for moving the web page image downward or after the lower edge of the web page image reaches the lower edge of the display range in the operation for moving the web page image upward. Specifically, it is determined that the end processing is necessary (1) when a downward dragging operation is performed in a state in which the upper edge of the web page image is at the upper edge of the display range, (2) when an upward dragging operation is performed in a state in which the lower edge of the web page image is at the lower edge of the display range, (3) when the upper edge of the web page image reaches the upper edge of the display range in automatic processing corresponding to a downward flick operation, (4) when the lower edge of the web page image reaches the lower edge of the display range in the automatic processing corresponding to an upward flick operation, (5) when the web page image is reduced and displayed in a state in which the upper edge of the web page image is at the upper edge of the display range, and (6) when the web page image is reduced and displayed in a state in which the lower edge of the web page image is at the lower edge of the display range.

Here, the web browser program causes the memory 18 to store a pointer indicating which part of the web page image is displayed and the display magnification used in displaying the web page image on the touch panel 12. It can be determined based on a value of this pointer whether or not the upper edge of the web page image is at the upper edge of the display range and whether or not the lower edge of the web page image is at the lower edge of the display range. Further, whether or not the dragging operation has been performed and a direction of the dragging operation can be determined based on an output from the touch pad interface 22. In addition, in this program, an automatic processing speed corresponding to the flick operation is stored in the memory 18, and when the automatic processing speed is higher than 0, it can be determined that downward automatic processing is being performed by the flick operation (the automatic processing is being performed). Alternatively, when the automatic processing speed is smaller than 0, it can be determined that the upward automatic processing is being performed by the flick operation (the automatic processing is being performed). On the other hand, when the automatic processing speed is 0, it can be determined that the automatic processing is not being performed. Further, whether or not the web page image is reduced and displayed can be determined based on the display magnification stored in the memory.

When the end processing is not necessary, it is then determined based on the output from the touch pad interface 22 whether or not the touch pad 12b is being touched (S103). When the touch pad 12b is being touched, the automatic processing speed is set to 0 (S104), and a vertical distance between the most recently detected touched position and the currently detected touched position, in other words, a dragging distance is acquired to move the web page image by this dragging distance (S105). Specifically, when the touched position has moved upward, the dragging distance is subtracted from the value of the pointer. Further, when the touched position has moved downward, the dragging distance is added to the value of the pointer. Then, a part of the web page image identified based on the updated pointer is displayed on the FPD 12a, and the procedure returns to the processing of Step S101.

When it is determined in Step S103 that the touch pad 12b is not being touched, it is determined whether or not the flick has been performed (S106). For example, it is determined that the flick has been performed when the vertical distance between the most recently detected touched position and the second most recently detected touched position, in other words, the most recent dragging distance (sliding speed) is equal to or larger than a predetermined distance and when no currently touched position has been detected. When it is determined that the flick has been performed, the automatic processing speed is set in accordance with the most recent dragging distance (S107). Specifically, as the dragging distance becomes longer, the automatic processing speed is set higher. Further, when the dragging is performed downward, the automatic processing speed is set to a positive value, and when the dragging is performed upward, the automatic processing speed is set to a negative value.

After that, the value of the automatic processing speed is added to the value of the pointer, and the part of the web page image identified based on the updated pointer is displayed on the FPD 12a (S109). In addition, the value of the automatic processing speed is caused to become closer to 0 (S110). For example, the automatic processing speed may be caused to become closer to 0 by a predetermined value at a time. When the automatic processing speed becomes 0 as a result of the processing of Step S110, the automatic processing is brought to an end. After that, the procedure returns to the processing of Step S101.

When it is determined in Step S106 that the flick has not been performed, it is determined whether or not the automatic processing is being currently performed (S108). Specifically, it is determined that the automatic processing is not being performed when the automatic processing speed is 0, and otherwise, it is determined that the automatic processing is being performed. When the automatic processing is not being performed, the procedure directly returns to the processing of Step S101, and when the automatic processing is being performed, the procedure advances to the processing of Step S109.

When it is determined in Step S101 that the end processing is necessary, the end processing illustrated in FIG. 9 is executed. In this processing, it is first determined whether or not the touch pad 12b is being touched (S1021). When the touch pad 12b is being touched, a difference in the vertical direction between the most recently touched position and the currently touched position, in other words, the dragging distance is acquired (S1022). Then, the display magnification is changed proportionately to the dragging distance acquired in Step S1022 (S1023). For example, when the dragging is being performed downward in the state in which the upper edge of the web page image is displayed at the upper edge of the display range, the display magnification is caused to become smaller as the dragging distance becomes larger. On the other hand, when the dragging is being performed upward in the state in which the upper edge of the web page image is displayed at the upper edge of the display range, the display magnification is caused to become closer to 1 in accordance with the dragging distance. Further, when the dragging is being performed upward in the state in which the lower edge of the web page image is displayed at the lower edge of the display range, the display magnification is caused to become smaller as the dragging distance becomes larger. On the other hand, when the dragging is being performed downward in the state in which the lower edge of the web page image is displayed at the lower edge of the display range, the display magnification is caused to become closer to 1 in accordance with the dragging distance. After that, the FPD 12a is caused to display the web page image based on the pointer and the display magnification that have been updated as described above (S1024).

When it is determined in Step S1021 that the touch pad 12b is not being touched, it is then determined whether or not the automatic processing is being performed (S1025). When the automatic processing is being performed, the display magnification is set in accordance with a level of the current automatic processing speed (S1026). For example, a value proportionate to an absolute value of the automatic processing speed may be subtracted from the display magnification. Alternatively, the display magnification may be multiplied by the value proportionate to the absolute value of the automatic processing speed (<1). Then, the FPD 12a is caused to display the web page image based on the display magnification updated in Step S1026 (S1027). At this time, when the upper edge of the web page image is at the upper edge of the display range, that state is maintained. Further, when the lower edge of the web page image is at the lower edge of the display range, that state is maintained. In addition, the automatic processing speed is caused to become closer to 0 (S1028). For example, the automatic processing speed may be caused to become closer to 0 by a predetermined value at a time. When the automatic processing speed becomes 0 as a result of the processing of Step S1028, the automatic processing is brought to an end.

Further, when it is determined in Step S1025 that the automatic processing is not being performed, the display magnification is caused to become closer to 1 (S1029). For example, the display magnification may be caused to become closer to 1 by a predetermined value at a time. Alternatively, the display magnification may be caused to become closer to 1 by a predetermined ratio at a time. After that, the FPD 12a is caused to display the web page image based on the updated display magnification (S1030). Also at this time, when the upper edge of the web page image is at the upper edge of the display range, that state is maintained. Further, when the lower edge of the web page image is at the lower edge of the display range, that state is maintained.

According to the portable information processing device 10 described above, when the upper edge of the web page image reaches the upper edge of the display range in the downward flick or dragging, the web page image does not move further downward, and instead, the web page image is reduced and displayed. Further, when the lower edge of the web page image reaches the lower edge of the display range in the upward flick or dragging, the web page image does not move further upward, and instead, the web page image is reduced and displayed. In this manner, it is possible to make it easier for the user to understand that the web page image has reached the lower limit or the upper limit.

Figure 10:
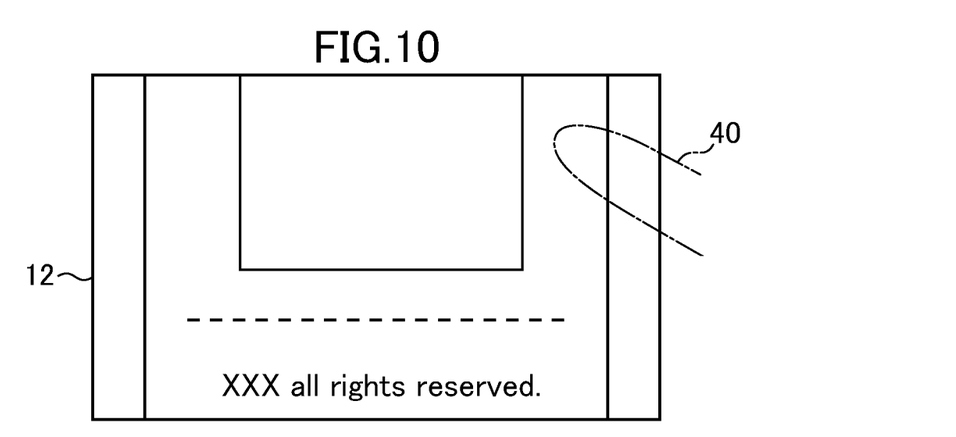
FIG. 10 A diagram illustrating the screen during end processing according to a first modified example.

Note that, the present invention is not limited to the above-mentioned embodiment. For example, the processing illustrated in FIGS. 8 to 9 is merely an example, and it should be understood that a user interface according to the present invention may be realized by another modified processing. Further, it should be understood that the present invention can be applied not only to the web page image but also to another image such as a photographic image. In addition, in the above description, the web page image is reduced and displayed in the end processing, but instead, may be enlarged and displayed. In other words, according to a first modified example, when the dragging is performed downward in the state illustrated in FIG. 5, as illustrated in FIG. 10, the web page image is enlarged and displayed. Also at this time, the display magnification may be caused to become larger as the dragging distance becomes larger. Further, the web page image may be enlarged only in a vertical direction, or may be enlarged in both a vertical direction and a horizontal direction.

In addition, in a case where the web page image is enlarged and displayed, an entirety of the web page image may be enlarged evenly as illustrated in FIG. 10, but may not necessarily be enlarged evenly. In other words, the same enlargement ratio may be applied to all the areas, or the enlargement ratio may be caused to differ depending on the area.

Figure 11:
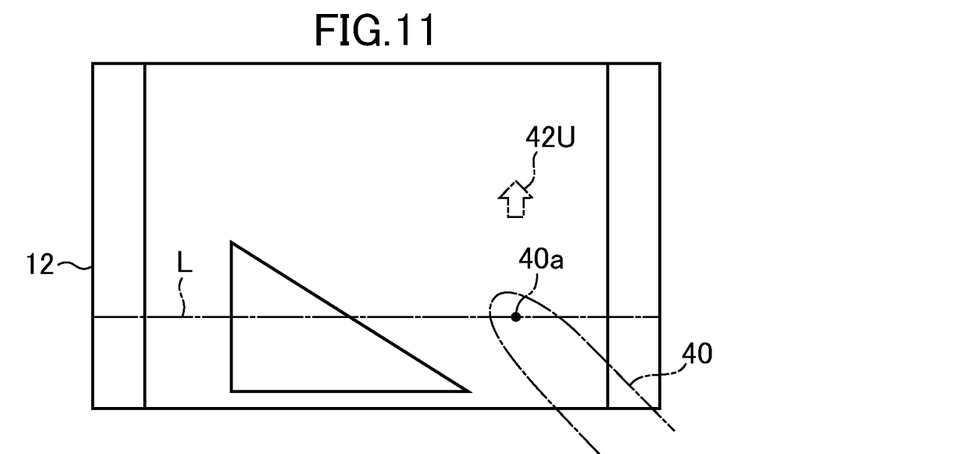
FIG. 11 A diagram illustrating the screen before end processing according to a second modified example.
Figure 12:
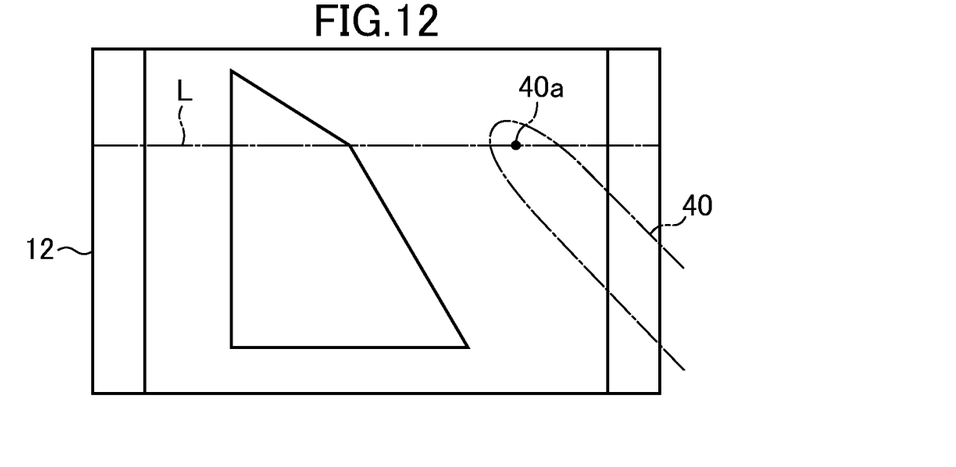
FIG. 12 A diagram illustrating the screen during the end processing according to the second modified example.

Here, an example of causing the enlargement ratio to differ depending on the area is described in detail. FIG. 11 illustrates the touch panel 12 on which a lower end portion of the web page image is displayed. Here, a right triangle is displayed in the lower end portion of the web page image. In this figure, reference numeral 40a indicates the touched position recognized by the touch pad interface 22. Further, reference symbol L indicates a straight line passing through the touched position 40a and extending in a horizontal direction. When the user slides the fingertip 40 in an upward direction indicated by an arrow 42U, according to a second modified example, as illustrated in FIG. 12, the touched position 40a is also moved upward and the straight line L is moved upward as well. Then, in the area above the straight line L, the web page image is displayed in the original size without being enlarged. Further, in the area therebelow, the web page image is vertically enlarged and displayed. Specifically, of an image indicating the lower end portion of the web page image illustrated in FIG. 11, the area above the touched position 40a is drawn in the original size without being enlarged. Further, the area below the touched position 40a is vertically enlarged and displayed. Also in this manner, it is possible to make it easier for the user to understand that the web page image has reached the lower limit or the upper limit.

Figure 13:
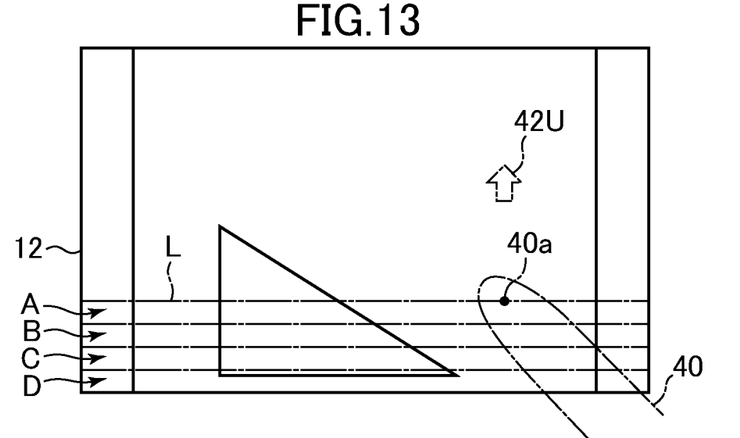
FIG. 13 A diagram illustrating the screen before end processing according to a third modified example.
Figure 14:
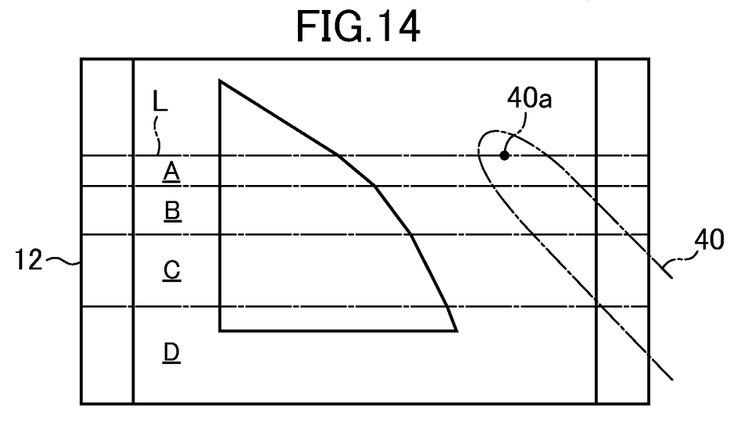
FIG. 14 A diagram illustrating the screen during the end processing according to the third modified example.

Further, according to the second modified example illustrated in FIG. 12, there is an abrupt change in scale between the area above the straight line L and the area therebelow, and hence a border therebetween is conspicuous. Therefore, by changing the enlargement ratio depending on the distance from the touched position, it is possible to prevent the border from being conspicuous. In other words, according to a third modified example, as illustrated in FIG. 13, the area below the straight line L is segmented into a plurality of strip-shaped areas A to D having the same width and extending along the straight line L, and the strip-shaped area farther from the straight line L is vertically enlarged at a larger enlargement ratio. In this manner, as illustrated in FIG. 14, the strip-shaped areas A to D farther from the straight line L become wider. As a result, the border between the area above the straight line L and the area therebelow becomes inconspicuous.

The invention claimed is:

1. An image display device, comprising:
   display unit operating to display on a screen a partial area image indicating a given area within an image to be displayed;
   display area moving unit operating to move the given area in response to a predetermined operation performed by a user; and
   determination unit operating to determine whether or not the given area is located at an end portion of the image to be displayed,
   wherein, when the given area is located at the end portion of the image to be displayed, in response to the predetermined operation performed by the user, instead of the display area moving unit moving the given area, the display unit changes an appearance of the partial area image displayed on the screen and displays the partial area image on the screen.

2. The image display device of claim 1, wherein the change of appearance is characterized as a distortion of the partial area image displayed on the screen.

3. The image display device of claim 2, wherein the distortion is characterized as a change in a display magnification of the partial area image displayed on the screen.

4. The image display device of claim 3, wherein the change in the display magnification is characterized by reducing the partial area image displayed on the screen in response to the predetermined operation performed by the user.

5. The image display device of claim 3, wherein the change in the display magnification is characterized by enlarging the partial area image displayed on the screen in response to the predetermined operation performed by the user.

6. The image display device of claim 1, wherein the display unit returns the appearance of the partial area image displayed on the screen to an original appearance after the predetermined operation performed by the user is completed.

7. An image display control method, comprising the steps of:
   displaying on a screen a partial area image indicating a given area within an image to be displayed;
   moving the given area in response to a predetermined operation performed by a user; and
   determining whether or not the given area is located at an end portion of the image to be displayed,
   wherein, when the given area is located at the end portion of the image to be displayed, in response to the predetermined operation performed by the user, instead of moving the given area, changing an appearance of the partial area image displayed on the screen and displaying the partial area image on the screen.

8. The method of claim 7, wherein the change of appearance is characterized as a distortion of the partial area image displayed on the screen.

9. The method of claim 8, wherein the distortion is characterized as a change in a display magnification of the partial area image displayed on the screen.

10. The method of claim 9, wherein the change in the display magnification is characterized by reducing the partial area image displayed on the screen in response to the predetermined operation performed by the user.

11. The method of claim 9, wherein the change in the display magnification is characterized by enlarging the partial area image displayed on the screen in response to the predetermined operation performed by the user.

12. The method of claim 7, further comprising returning the appearance of the partial area image displayed on the screen to an original appearance after the predetermined operation performed by the user is completed.

13. A computer including a processor executing a computer program, which causes the computer to function as:
    display unit operating to display on a screen a partial area image indicating a given area within an image to be displayed;
    display area moving unit operating to move the given area in response to a predetermined operation performed by a user; and
    determination unit operating to determine whether or not the given area is located at an end portion of the image to be displayed; and
    wherein, when the given area is located at the end portion of the image to be displayed, in response to the predetermined operation performed by the user, instead of the display area moving unit moving the given area, the display unit changes an appearance of the partial area image displayed on the screen and displays the partial area image on the screen.

14. The computer of claim 13, wherein the change of appearance is characterized as a distortion of the partial area image displayed on the screen.

15. The computer of claim 14, wherein the distortion is characterized as a change in a display magnification of the partial area image displayed on the screen.

16. A non-transitory, computer readable information storage medium having stored thereon a program for causing a computer to function as:
    display unit operating to display on a screen a partial area image indicating a given area within an image to be displayed;
    display area moving unit operating to move the given area in response to a predetermined operation performed by a user; and
    determination unit operating to determine whether or not the given area is located at an end portion of the image to be displayed; and
    wherein, when the given area is located at the end portion of the image to be displayed, in response to the predetermined operation performed by the user, instead of the display area moving unit moving the given area, the display unit changes an appearance of the partial area image displayed on the screen and displays the partial area image on the screen.

17. The non-transitory, computer readable information storage medium of claim 16, wherein the change of appearance is characterized as a distortion of the partial area image displayed on the screen.

18. The non-transitory, computer readable information storage medium of claim 17, wherein the distortion is characterized as a change in a display magnification of the partial area image displayed on the screen.

* * * * *